United States Patent [19]
Manstrom

[11] Patent Number: 5,909,999
[45] Date of Patent: Jun. 8, 1999

[54] METHOD TO MAXIMALLY UTILIZE THE LOADING CAPACITY OF AN INDIVIDUAL WAGON AND THE TRAIN WHEN LOADING WITH BULK MATERIAL

[75] Inventor: Hilding Manstrom, Lulea, Sweden

[73] Assignee: Luossavaara-Kiirunavaara AB (LKAB), Lulea, Sweden

[21] Appl. No.: 08/913,351

[22] PCT Filed: Jan. 9, 1996

[86] PCT No.: PCT/SE96/00006

§ 371 Date: Nov. 17, 1997

§ 102(e) Date: Nov. 17, 1997

[87] PCT Pub. No.: WO96/26142

PCT Pub. Date: Aug. 29, 1996

[30] Foreign Application Priority Data

Feb. 24, 1995 [SE] Sweden .................................. 9500692

[51] Int. Cl.[6] .................................................. B65G 67/22
[52] U.S. Cl. .......................... 414/809; 414/21; 414/329; 414/397; 177/DIG. 8; 177/163
[58] Field of Search .................................... 414/328, 329, 414/397, 338, 334, 335, 336, 809, 800, 221; 193/3, 4, 30, 15; 177/DIG. 8, 163

[56] References Cited

U.S. PATENT DOCUMENTS

| | | | |
|---|---|---|---|
| 3,002,637 | 10/1961 | Miller | 414/397 |
| 3,235,104 | 2/1966 | Morawski et al. | 414/329 |
| 4,125,195 | 11/1978 | Sasadi | 414/328 X |
| 4,629,392 | 12/1986 | Campbell et al. | 414/329 X |
| 4,659,274 | 4/1987 | France | 414/329 X |
| 4,904,154 | 2/1990 | Campbell et al. | 414/329 X |

FOREIGN PATENT DOCUMENTS

| | | | |
|---|---|---|---|
| 1215587 | 4/1966 | Germany | 414/397 |
| 709487 | 1/1980 | U.S.S.R. | 414/329 |
| 1291517 | 2/1987 | U.S.S.R. | 414/329 |
| 1009841 | 11/1965 | United Kingdom | 414/397 |

*Primary Examiner*—Frank E. Werner
*Attorney, Agent, or Firm*—John Lezdey & Assoc

[57] ABSTRACT

A method for maximizing the loading capacity of a wagon or wagon train when loading with pourable material from a silo. The method utilizes a computer which determines the type of wagon to be loaded on the basis of values obtained with sensors.

7 Claims, 1 Drawing Sheet

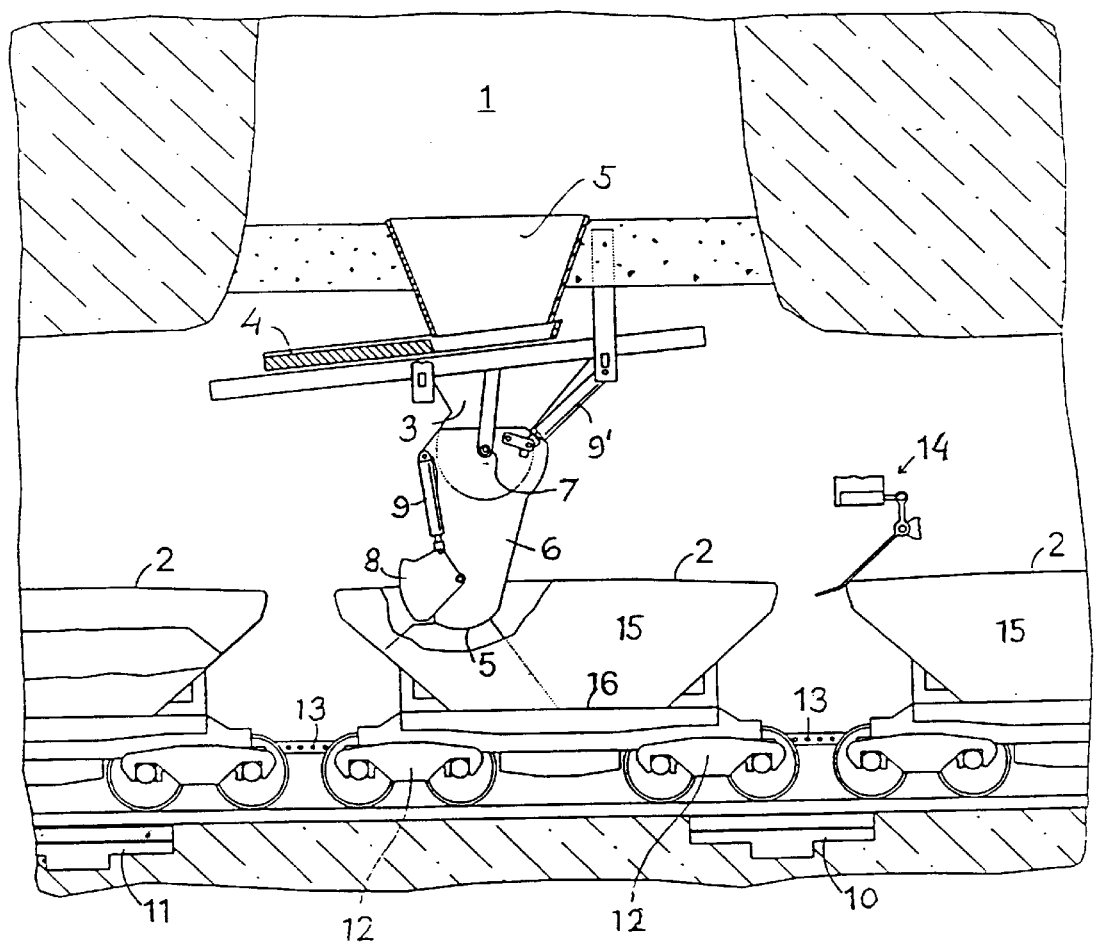

METHOD TO MAXIMALLY UTILIZE THE LOADING CAPACITY OF AN INDIVIDUAL WAGON AND THE TRAIN WHEN LOADING WITH BULK MATERIAL

FIELD OF THE INVENTION

The present invention provides a method for maximizing the loading capacity of a wagon or wagon train when loading with pourable material from a silo. More particularly, the method utilizes a computer which determines the type of wagon to be loaded on the basis of values obtained with sensors.

BACKGROUND OF THE INVENTION

Bulk materials are normally loaded onto railway freight cars or wagons, by passing a number of mutually hitched wagons through a loading zone above which there is arranged a storage unit or silo in which bulk materials, such as ore concentrates or pellets, are stored. The material is discharged from the silo down into an underlying wagon through the medium of a chute provided with an outlet opening, referred to here as a material delivery chute. Loading of the wagons takes place automatically and the outlet end of the delivery chute is provided with a flap whose width is sufficient to cause the material pouring from the chute to be distributed uniformly in the wagon.

Australian Publication B 55576/86 teaches one such type of loading arrangement where the intention is to distribute the weight of the material equally at both ends of the wagon while, at the same time, maintaining an essentially constant height, or level of the material in the wagon, therewith to utilize the capacity of the wagon effectively. To this end, the wagon is weighed and its height is determined and also its passage through specific points. On the basis of this information, the material delivery chute is controlled to deliver a specific volume or weight of material to the wagon and to distribute the material uniformly in the wagon while levelling the material therein at the same time.

When seen against the background of the number of wagons that annually transport bulk materials of the aforesaid kind, such as ore, ore concentrates or pellets, it is a natural aim to utilize the load capacity of each wagon and each wagon train to a maximum. Wagon wheels and wagon baskets become worn and in time a wagon may become one or two tonnes lighter in weight. Its loading capacity has not diminished, however. The endeavour to constantly utilize the full load capacity of individual wagons or freight cars is readily understandable.

SUMMARY OF THE INVENTION

The present invention relates to a method which enables this to be achieved in accordance with the characterizing features set forth in the following claims.

A method of utilizing the loading capacity of a wagon and a wagon train to a maximum when loading with pourable material, particularly bulk material, from a silo with the aid of a raisable and lowerable delivery chute having an outlet opening, down into a wagon moving beneath the chute. The by-passing wagon to be filled is weighed and its empty weight registered. The method is characterized by registering the type of by-passing wagon to be filled and by feeding to a computer registered data representing the weight of an empty wagon and the type of wagon concerned. This data, in the form of signals, is fed into the computer and the computer functions to move the outlet opening of the chute to a height above the bottom of the wagon in accord with the type of wagon concerned on the basis of said data and the density of the bulk material through the medium of manoeuvering devices wherein the height at which the chute outlet opening is located above the bottom determines the volume of bulk material that corresponds to the maximum permitted total weight of this individual wagon.

BRIEF DESCRIPTION OF THE DRAWING

The drawing schematically in side view is an arrangement of an apparatus for carrying out the method of the invention.

DESCRIPTION OF THE PREFERRED EMBODIMENTS

The invention will now be described in more detail with reference to an exemplifying embodiment thereof and also with reference to the accompanying drawing which illustrates schematically and in side view an arrangement of apparatus for carrying out the inventive method.

The drawing illustrates a silo 1 for storing bulk materials such as ore concentrates or pellets. The silo is located in a high rock elevation above a loading zone through which a plurality of railway wagons or freight cars 2 continuously move during a loading operation. Extending from the silo 1 is a metering means which functions to meter material into respective wagons 2 and to uniformly distribute the load therein. The metering means has a conical upper part 3 which is located adjacent to or connects with a closure flap 4 provided at the silo outlet 5. A material delivery chute 6 is pivotally mounted on a shaft 7 beneath the outlet 5, the upper part 3 of the metering means and the closure flap 4. The lower part of the delivery chute 6 is provided with a closure flap 8 whose position relative to the chute opening is controlled by a piston-cylinder maneuvering device 9. Pivotal movement of the delivery chute in relation to said conical part 3, or downfeed funnel 3, is also effected with the aid of a piston-cylinder maneuvering device referenced 9' in the drawing. The delivery chute 6 can be swung clockwise from its illustrated discharging position to a generally horizontal rest position in which it enables wagons 2 to pass freely therebeneath.

The illustrated arrangement also includes a conventional weighing machine 10 over which the bogies 12 of respective wagons 2 are intended to pass, so that there weights and tare weights can be established.

Arranged along the rail track in the loading zone is a sensor 13 which functions to establish the instantaneous positions of a wagon to be filled as the wagon moves through the loading zone beneath the silo 1. Also provided is an angle indicator 14 which detects and registers the height of an arriving wagon above the rail track. The angle indicator 14 has a slip arm which gives an angle indication immediately the end wall of a wagon begins to lift the arm while registering the first or leading end of the wagon at the same time, in a manner that will be readily understood. The same applies when the arm leaves the passing wagon. The length of the wagon is registered by the horizontal sensor 13 and the empty weight or tare weight of the wagon is registered by the weighing machine 10.

This registered data is fed into a computer which determines the type of wagon to be loaded on the basis of the values obtained with the aid of sensors 13 and 14. The height of the bottom 16 of the wagon above the rail track is therewith determined by this information or data. The computer is able to determine the height of the outfeed end of the delivery chute above the bottom 16 of the wagon basket 15 on the basis of these values and with knowledge of the density of the bulk material and the permitted total weight of the wagon. As the wagon moves beneath the silo, the wagon is filled continuously with bulk material from the silo via the delivery chute 6, the adjusted height of which corresponds to the maximum load of the type of wagon concerned. The height adjustment to the delivery chute 6 is effected with the aid of the piston-cylinder device 9' and movement of the closure flap 8 is controlled with the aid of the piston-cylinder device 9.

The total weight of the now filled carriage 2 is then registered with the aid of the weighing machine 11, it being established whether or not the weight of the wagon exceeds its maximum permitted total weight or whether the weight of the wagon is below this weight. For instance, if it is found that the wagon that has just been loaded weighs less than the maximum permitted total weight, the next wagon in line can be loaded to a correspondingly greater extent than the preceding wagon, whereas if it is found that the wagon that has just been loaded weighs more than the maximum permitted total weight, the next wagon in line can be loaded to a correspondingly lesser extent. This enables the total weight of the wagon train to be adjusted constantly to an optimum. It will be understood that any excess weight will be comparatively small and will lie within the safety margins of the wagons.

It will also be understood that the sensors 13 and 14 for instance may be of another kind which, for instance, will enable the type of wagon concerned to be identified by given markings on the sides of the wagon which can be read-off and therewith disclose the type of wagon concerned. It will also be understood that the height-measuring angle indicator may alternatively have the form of a vertical ramp of photocells.

I claim:

1. A method of utilizing to a maximum the load-carrying capacity of a wagon or a train of wagons when filling said wagon with pourable bulk material, from a silo having a raisable and lowerable delivery chute which includes an outlet opening and which functions to discharge said material into said wagon moving beneath the chute, wherein said moving wagon to be loaded is weighed and its empty weight registered, which comprises registering the type of said moving wagon to be filled, and feeding registered data representative of said empty weight of the wagon and the height of the wagon concerned to a computer which on the basis of this data and the density of the bulk material causes the outlet opening of the chute to be positioned at a fixed height above the wagon bottom which is in accord with the type of wagon concerned, through the medium of manoeuvering devices, said fixed height determining the volume of bulk material that corresponds to the maximum permitted total weight for this individual wagon and supplying said pourable material from said chute in accordance with said data to load said wagon.

2. A method according to claim 1, comprising weighing the loaded wagon and registering its total weight and comparing the registered weight with the maximum permitted total weight of the wagon concerned, wherein the difference between the registered total weight and the maximum permitted total weight is fed as data to the computer, wherein on the basis of this data the outlet opening of the delivery chute is guided to a height above the bottom of a following wagon such that the wagon will be loaded with correspondingly less bulk material when said difference is positive and correspondingly more bulk material when said difference is negative.

3. The method of claim 1 wherein a sensor detects and registers the height of the wagon.

4. The method of claim 3 wherein said sensor is an angle indicator having a slip arm which provides an angle indication.

5. A method of utilizing to a maximum the load-carrying capacity of a wagon and a train of wagons comprising the steps of:

supplying a wagon with pourable bulk material, from a silo with the aid of a raisable and lowerable delivery chute which includes an outlet opening and which functions to discharge said material into said wagon moving beneath the chute, wherein said moving wagon is weighed and its empty weight registered, which comprises registering the type of said moving wagon to be filled, and feeding the registered data representative of said empty weight of said wagon and the height of the wagon concerned to a computer which on the basis of this data and the density of the bulk material causes the outlet opening of the chute to be positioned at a fixed height above the wagon bottom which is in accord with the type of wagon concerned, through the medium of maneuvering devices, said fixed height determining the volume of bulk material that corresponds to the maximum permitted total weight for this individual wagon, weighing the loaded wagon and registering its total weight and comparing the registered weight with the maximum permitted total weight of the wagon concerned, wherein the difference between the registered total weight and the maximum permitted total weight is fed as data to the computer, wherein on the basis of this data the outlet opening of the delivery chute is guided to a fixed height above the bottom of a following wagon such that the wagon will be loaded with correspondingly less bulk material when said difference is positive and correspondingly more bulk material when said difference is negative.

6. A method of loading pourable bulk material to maximize the load carrying capacity of a moving wagon or train of wagons from a silo having a delivery chute which comprises the steps of:

moving said wagon past an angle sensor which detects and registers the height of said wagon above the rail track and past a horizontal sensor which establishes the instantaneous position and length of said wagon;

weighing said wagon to establish an empty weight of said wagon;

feeding signals from said angle sensor and said horizontal sensor along with the density of the bulk material to provide input data to a computer;

positioning said delivery chute above the bottom of said wagon on the basis of said input data to said computer to a fixed height which corresponds to the maximum permitted total weight for said wagon supplying bulk material to said wagon by controllably opening and closing said delivery chute to correspond to said fixed height; and detecting a difference between the empty wagon and the registered total weight of the loaded wagon.

7. The method of claim 6 wherein the difference between the registered total weight and the maximum permitted total weight is fed as data to the computer, wherein on the basis of this data the outlet opening of the delivery chute is guided to a height above the bottom of a following wagon such that the wagon will be loaded with correspondingly less bulk material when said difference is positive and correspondingly more bulk material when said difference is negative.

* * * * *